United States Patent
Miller et al.

(10) Patent No.: US 9,410,870 B2
(45) Date of Patent: Aug. 9, 2016

(54) METHOD AND SYSTEM FOR DATA REDUNDANCY STORAGE

(71) Applicant: Progress Rail Services Corporation, Albertville, AL (US)

(72) Inventors: Marc David Miller, Lee's Summit, MO (US); Mark Alan Fanara, Blue Springs, MO (US); Stephen Harold Humphrey, Pleasant Hill, MO (US); Todd Charles Goergen, Blue Springs, MO (US); Gregory Richard Bressler, Summerdale, PA (US)

(73) Assignee: Progress Rail Services Corporation, Albertville, AL (US)

( * ) Notice: Subject to any disclaimer, the term of this patent is extended or adjusted under 35 U.S.C. 154(b) by 0 days.

(21) Appl. No.: 14/500,081

(22) Filed: Sep. 29, 2014

(65) Prior Publication Data

US 2016/0091396 A1    Mar. 31, 2016

(51) Int. Cl.
| | |
|---|---|
| *G01M 17/00* | (2006.01) |
| *G06F 7/00* | (2006.01) |
| *G06F 19/00* | (2011.01) |
| *G01M 17/08* | (2006.01) |
| *G07C 5/02* | (2006.01) |
| *G07C 5/08* | (2006.01) |
| *B61C 17/00* | (2006.01) |

(52) U.S. Cl.
CPC ............. *G01M 17/08* (2013.01); *B61C 17/00* (2013.01); *G07C 5/02* (2013.01); *G07C 5/08* (2013.01)

(58) Field of Classification Search
CPC ............ G01M 17/08; G07C 5/02; G07C 5/08
USPC ................. 701/1, 19, 20, 32.2, 33.3, 33.4
See application file for complete search history.

(56) References Cited

U.S. PATENT DOCUMENTS

| | | | | |
|---|---|---|---|---|
| 5,065,321 A | * | 11/1991 | Bezos | B60L 3/12 340/870.41 |
| 8,655,517 B2 | | 2/2014 | Brand et al. | |
| 8,719,382 B2 | | 5/2014 | Cooper et al. | |
| 2002/0101509 A1 | * | 8/2002 | Slomski | G07C 5/085 348/143 |
| 2003/0093187 A1 | * | 5/2003 | Walker | B64C 13/20 701/1 |
| 2004/0049324 A1 | * | 3/2004 | Walker | B60R 25/02 701/1 |
| 2005/0178928 A1 | * | 8/2005 | Wade | B61L 29/00 246/1 R |
| 2005/0198313 A1 | * | 9/2005 | Branigan | G06F 9/546 709/228 |
| 2005/0253926 A1 | * | 11/2005 | Chung | B61L 15/0027 348/148 |
| 2005/0273473 A1 | * | 12/2005 | Grace | H04L 67/1095 |
| 2006/0229980 A1 | * | 10/2006 | Habaguchi | G06F 21/10 705/40 |
| 2008/0258885 A1 | * | 10/2008 | Akhan | G07C 5/085 340/425.5 |
| 2009/0112381 A1 | * | 4/2009 | Schwinn | G07C 5/085 701/14 |
| 2009/0299555 A1 | * | 12/2009 | Houpt | B61L 27/0027 701/19 |
| 2010/0259373 A1 | * | 10/2010 | Chang | H04N 7/181 340/438 |

(Continued)

*Primary Examiner* — Jamie Figueroa
(74) *Attorney, Agent, or Firm* — Finnegan, Henderson, Farabow, Garrett & Dunner, LLP

(57) ABSTRACT

A computer-implemented method includes a first controller configured to receive and record operational data associated with operation of a locomotive, process, via a processor, the operational data, and determine, using the processor, a data storage plan for the operational data. The data storage plan can dynamically change based on the operational data. The system may be further configured to store the operational data with a second controller associated with a second locomotive according to the data storage plan.

20 Claims, 4 Drawing Sheets

(56) References Cited

U.S. PATENT DOCUMENTS

| | | |
|---|---|---|
| 2011/0282525 A1 | 11/2011 | Kraeling et al. |
| 2011/0284699 A1 | 11/2011 | Cooper |
| 2012/0158910 A1* | 6/2012 | Cooper .................. H04L 67/12 709/219 |
| 2013/0268138 A1 | 10/2013 | Moughler et al. |
| 2013/0344802 A1 | 12/2013 | Armour et al. |
| 2014/0052315 A1* | 2/2014 | Isailovski ................ B61L 3/002 701/19 |
| 2014/0107876 A1* | 4/2014 | Kapp ...................... B61L 3/006 701/20 |

\* cited by examiner

METHOD AND SYSTEM FOR DATA REDUNDANCY STORAGE

TECHNICAL FIELD

This disclosure relates generally to event recorders and, more specifically, to a system and method for redundant data storage associated with event recorders.

BACKGROUND

Locomotives may include a system for receiving and logging operational data for use in troubleshooting or diagnosing a locomotive failure. These systems may include an event recorder that collects and communicates vehicle performance data received from multiple subsystems within the locomotive. An important purpose of the event recorder is to provide a source of data that can be retrieved from the event recorder after an event such as an accident, and provide a detailed and accurate accounting of exactly what happened leading up to and during the event. In some systems, the data is collected periodically or in response to a triggering event or fault condition. Each locomotive may have its own event recorder.

If an accident occurs, such as a derailment, crash, or other mishap, the event recorder data may be useful to help determine the cause of the event, or conditions that may have contributed to the event. In a catastrophic event, one or more event recorders may be destroyed along with the locomotive on which the event recorder is operating. Each event recorder records unique data associated with the corresponding locomotive, and at times, the entire consist. If an event recorder is destroyed in a catastrophic event, important data unique to that locomotive may also be destroyed. Therefore, it may be desirable to provide an event recorder system that provides redundant data storage across all event recorders operating on a single train. Since redundant data storage may consume large portions of memory, it may also be desirable for dynamic data storage that operates according to operational factors, such as, for example, locomotive velocity, alarms, detected physical hazards, or one or more potential hazards.

One system for storing operational data for a vehicle is disclosed U.S. Patent Application Publication No. 2011/0282525 ("the '525 publication"). The '525 publication describes a communication system for monitoring operation of transceiver pairs, and communicating network data over a cable bus if one of the transceivers enters a failure condition. The system includes a switch module that monitors operation of the transceiver pair, and sends the network data from at least one transceiver unit in the redundant pair if a transceiver failure is detected.

Although the system provided by the '525 publication may provide for routing redundant data from a failing transceiver, it may be less than optimal. In particular, the '525 publication does not provide a system that allows for simultaneous and dynamic data storage based on data storage rules. Additionally, the '525 publication does not take operational factors into consideration, which continually change during the operation of the locomotive.

The presently disclosed systems and methods are directed to overcoming and/or mitigating one or more of the possible drawbacks set forth above and/or other problems in the art.

SUMMARY

In accordance with one aspect, the present disclosure is directed to a recording system. The recording system may include a first controller configured to receive and record operational data associated with operation of a locomotive, process, via a processor, the operational data, and determine, using the processor, a data storage plan for the operational data. The data storage plan can dynamically change based on the operational data. The system may be further configured to store the operational data with a second controller associated with a second locomotive according to the data storage plan.

In accordance with another aspect, a non-transitory computer-readable storage medium storing program code may be operable to cause a processor to, when executed, receive and record operational data associated with operation of a locomotive, process, via the processor, the operational data, and determine, using the processor, a data storage plan for the operational data. The data storage plan can dynamically change based on the operational data. The storage medium may be further configured to cause the processor to store the operational data with a second controller associated with a second locomotive according to the data storage plan.

In accordance with another aspect, the present disclosure is directed to a computer-implemented method including a first controller that is configured to receive and record operational data associated with operation of a locomotive, process, via a processor, the operational data, and determine, using the processor, a data storage plan for the operational data. The data storage plan can dynamically change based on the operational data. The system may be further configured to store the operational data with a second controller associated with a second locomotive according to the data storage plan.

DETAILED DESCRIPTION

Figure 1:
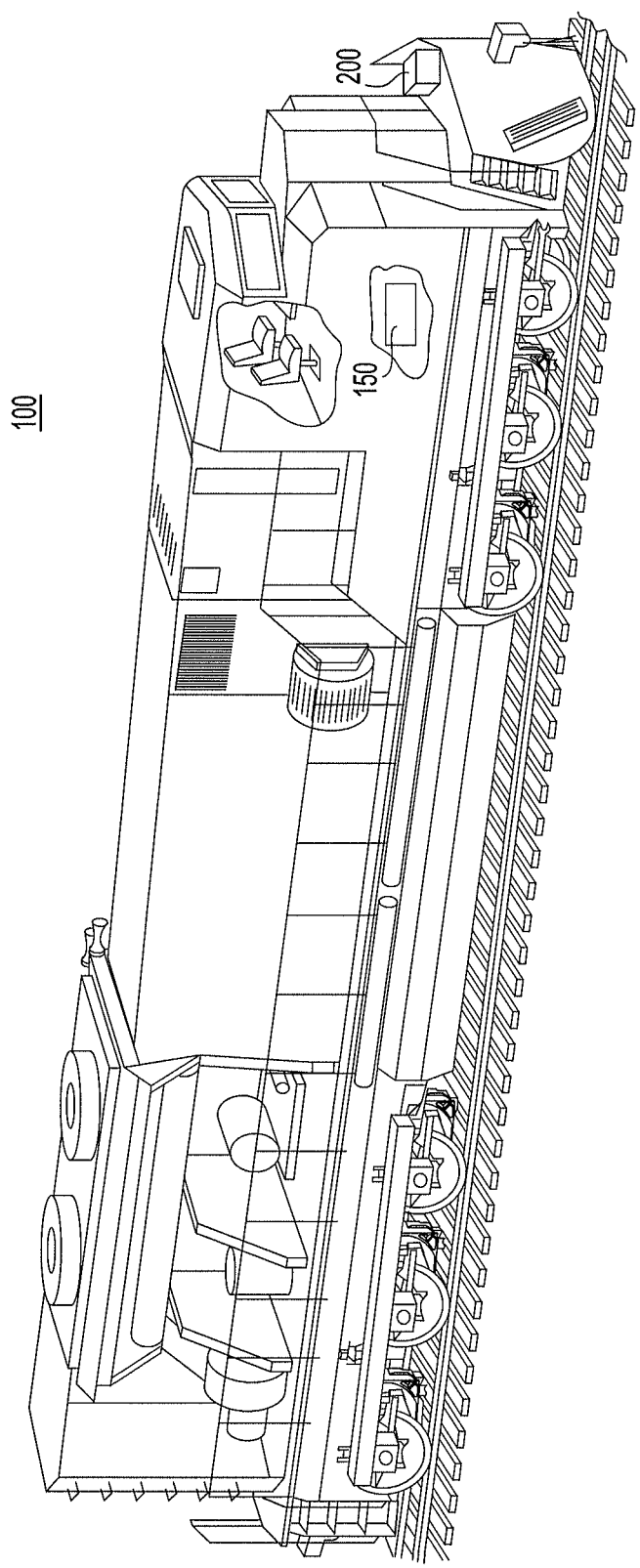
FIG. 1 is a perspective view of an exemplary embodiment of a locomotive.

FIG. 1 shows an exemplary locomotive 100 in which systems and methods for recording events may be implemented consistent with the disclosed exemplary embodiments. Locomotive 100 may include a power system 150 for powering locomotive 100. In one embodiment, power system 150 may include, for example, a uniflow two-stroke diesel engine system. Power system 150 may also include controls for designating the direction, speed, and braking of locomotive 100. Power system 150 may have a power characteristic that describes a current property of power system 150. The power characteristic may include, for example, temperature, power level, fuel efficiency, and fuel level. The power characteristics may also define characteristics of the vehicle (e.g., locomotive 100) as they relate to power. For example, power characteristics may also be indicative of vehicle speed and/or the operation mode associated with the vehicle. For example, the operation mode may include an OFF mode and an ON mode. The ON mode may be one or more of a power mode, a secondary power mode, a dynamic braking mode, a blended brake mode, an emergency brake mode, a rollback mode, and an opposite-direction brake mode.

In addition to power system 150, locomotive 100 may also include a recording system 200 for obtaining and storing signal data. According to some embodiments, at least a portion of recording system 200 may be located at or near the front of locomotive 100. For example, FIG. 2 shows an exemplary embodiment of a recording system 200 for storing data for locomotive 100.

Figure 2:
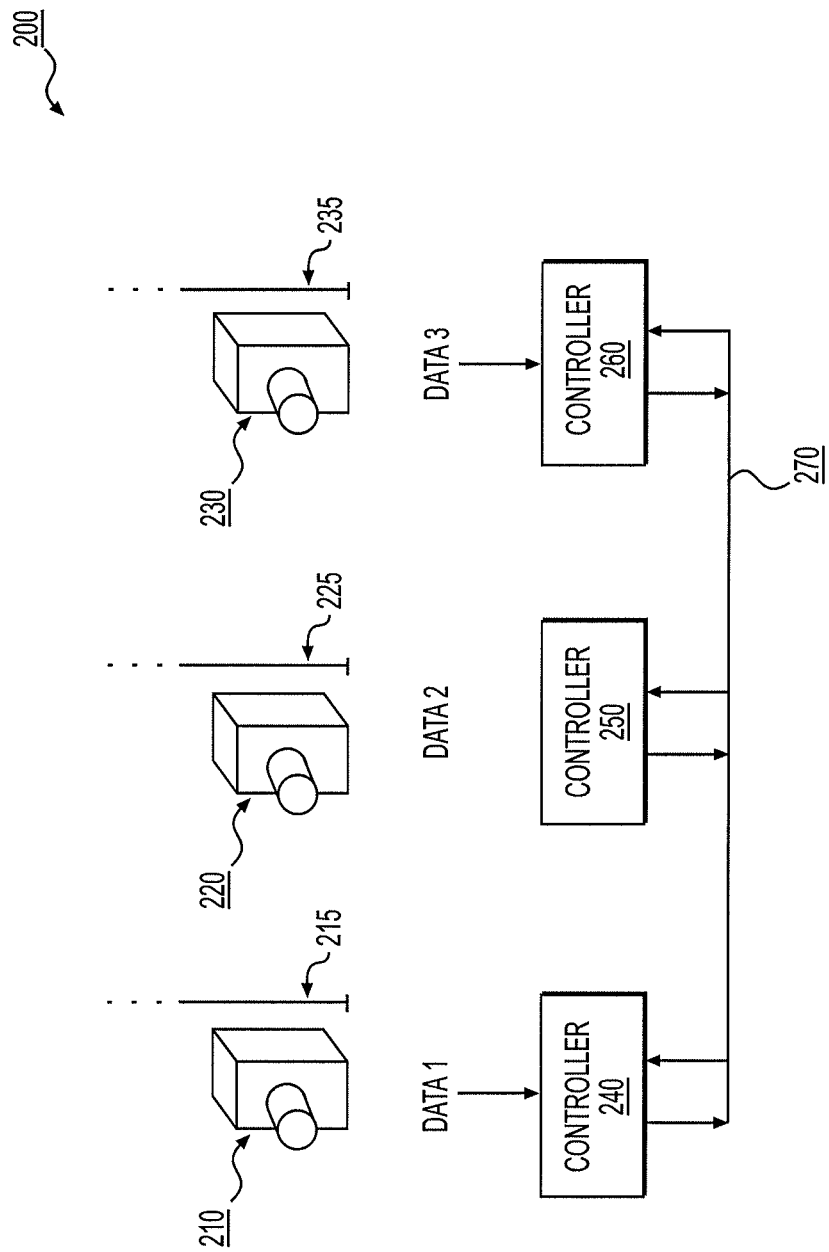
FIG. 2 is a schematic diagram of an exemplary embodiment of a redundant data storage system.

Referring now to FIG. 2, an exemplary recording system 200 is described. Recording system 200 may include one or more cameras (for example, cameras 210, 220, and/or 230) for capturing images. Cameras 210, 220, and/or 230 may be one or more front-facing cameras positioned behind the nose windshield of locomotive 100, or positioned in one or more other directions, and configured to record the surrounding environment of locomotive 100. Cameras 210, 220, and 230 may be video cameras capable of capturing a continuous stream of images. Additionally or alternatively, cameras 210, 220, and 230 may be configured to record images periodically. Cameras 210, 220, and 230 may be able to operate at a first resolution and a second resolution, where images recorded at the second resolution may occupy less memory when stored. For example, cameras 210, 220, and 230 may have a high resolution mode (e.g., corresponding to a first resolution) and a low resolution mode (e.g., corresponding to a second resolution). Another difference between high resolution and low resolution may include the frame rate at which the images are recorded. For example, a high resolution mode may record at a higher frame rate as compared to a low resolution mode recording. As another example, a high resolution setting may record at a similar frame rate as lower resolution, but with a higher pixel count per frame as compared to a lower resolution setting with a lower pixel count per frame. Any measure of quality that can be adjusted while data is being recorded, rather than at any point post-capture, can characterize the resolution at which data is recorded. According to some embodiments, cameras 210, 220, and 230 may record images in a single resolution (for example, a high resolution), then transmit the images to a data controller for image processing, which may include a resolution reduction for data storage. Accordingly, recording system 200 may be configured for adjusting a resolution of the operational data based on the operational data.

According to some embodiments, cameras 210, 220, and 230 may include multiple cameras, such that switching between high and low resolutions changes the camera capturing the images. According to yet other embodiments, cameras 210, 220, and 230 may record one or more of a plurality of data channels on the same camera. For example, camera 210 may record a first data channel at a first resolution, and may record a second data channel at a second resolution, where the second data channel is a subset of the first data channel. Accordingly, the first data channel may provide video data showing a wide view of the camera feed, and the second data channel may provide video data showing a magnified portion of the same view. According to another embodiment, a first data channel may provide video data showing a particular view at a first resolution, and the second data channel may provide the same view at a second resolution. To store the images, recording system 200 may also include a storage device, such as a non-transitory computer-readable storage medium. According to some embodiments, the storage device is configured to be part of a controller. According to other embodiments, the non-volatile storage device may be a separate device that is operatively connected to a data controller.

Recording system 200 may include one or more controllers 240, 250, and 260 (e.g., including one or more microprocessors) to control the quality at which images are recorded by camera 210, 220, and/or 230. According to the embodiment shown in FIG. 2, recording system 200 may include a controller 240 dedicated to controlling camera 210, processing data, and determining a data storage plan. Controller 240 may also perform data storage with one or more of a plurality of controllers and/or storage devices (e.g., 250, and 260). Accordingly, controller 250 may be dedicated to controlling camera 220, and controller 260 may be dedicated to controlling camera 230, respectively. Additionally or alternatively, one controller (e.g., controller 240) may be configured to control all of cameras 210, 220, and 230, and controllers 250 and 260 may be configured to store data and/or perform other operations as instructed by controller 240. According to one aspect, controller 240 may be one portion of a locomotive power controller configured to operate locomotive 100.

Recording system 200 may record multiple channels on a first controller (e.g., controller 240), where two or more of the channels are recorded at different resolutions. According to another embodiment, recording system 200 may save recorded data at a first resolution at a first controller (e.g., controller 240), and save a second data at a second resolution at a second controller (e.g., controller 250). The first data and the second data may be data representing the same view, but at different resolutions. Accordingly, the recorded data from the first controller may redundantly store the data, with the redundant storage being stored at a lower resolution. According to other embodiments, the first data and the second data may include two different views.

Recording system 200 may record operational data (e.g., operational data 215) in connection with the operation of the locomotive. Operational data may include, for example, travel velocity, time information, date information, geographic information, GPS (Global Positioning System) information, an alarm status, a power level, and/or other control information in connection with the operation of locomotive 100. Recording system 200 may save operational data in connection with each respective locomotive in a consist, such as, for example, data 225 and 235 from a second locomotive and a third locomotive.

Controllers 240, 250, and 260 may embody a single processor or multiple processors that include a means for receiving data signals and storing and/or communicating at least a portion of time-stamped data signals. Additionally or alternatively, controllers 240, 250, and 260 may include a portion or all of recording system 200. Controllers 240, 250, and 260 may include all components required to run an application, such as, for example, a memory, a secondary storage device, and a processor, such as a central processing unit or other known means. Controllers 240, 250, and 260 may also include a computer-readable storage medium storing program code operable to cause a processor to, when executed, perform the data storage operations described herein. Various other known circuits may be associated with controller 240, including power source circuitry (not shown) and other appropriate circuitry. Controllers 240, 250, and 260 may be capable of receiving data signals as well as logging commands. Controllers 240, 250, and 260 may also include one or more non-transitory computer-readable storage media for data storage as described in exemplary embodiments herein.

Recording system 200 may operatively connect controllers 240, 250 and 260 via a communication network 270. According to one embodiment, communication network 270 is a BUS that physically connects each of the plurality of controllers 240, 250, and 260. For example, according to one embodiment, controller 240 may receive operational data 215 that includes video data, auditory data, and control signal data in connection with the operation of the locomotive on which controller 240 is installed. Controller 240 may store and process the data on controller 240, and deliver the data to another controller 250 for redundant storage. Controller 250 may be physically located on a second locomotive (not shown), and recording operational data 225 in connection with the operation of the second locomotive. Controller 240 and 250 may be directly connected to one another. The operational data 225 recorded and stored on controller 250 may be transmitted to controller 260, along with the operational data received from controller 240. The data from controller 260 may be transmitted to controller 240 and 250. Accordingly, controllers 240, 250, and 260 may redundantly store each other's data. In one aspect, the data is simultaneously recorded and streamed between each respective controller of recording system 200. According to another embodiment, system 200 may transmit blocks of recorded information from controller to controller at periodic time intervals.

Figure 3:
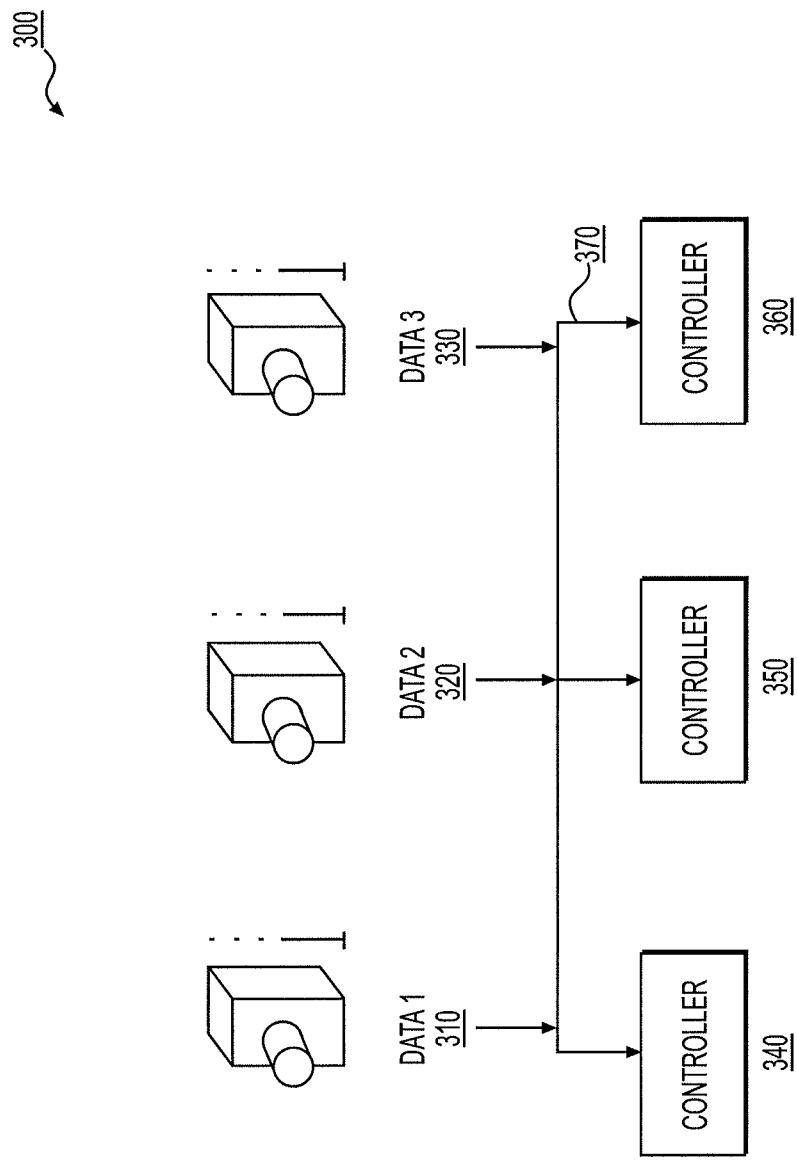
FIG. 3 is a schematic diagram of another exemplary embodiment of a redundant data storage system.

FIG. 3 depicts an exemplary embodiment of a recording system 300 for storing data for locomotive 100. According to some embodiments, a recording system may be configured to broadcast one or more data feeds to a plurality of controllers and/or non-volatile memory stores. Accordingly, each of the operatively connected controllers (each containing or connected to a respective memory store) may both send data in connection with its own operation, and simultaneously receive data in connection with the operation of each of the other respective locomotives. Each of controllers 340, 350, and 360 may be operably connected through a communication network 370. Accordingly, each of the operatively connected controllers may redundantly store the data from the other controllers.

For example, recording system 300 may store redundant data across a plurality of operatively connected controllers (e.g., 340, 350, and 360) by broadcasting data from each respective locomotive across wireless communication network 370. According to one exemplary embodiment, controller 340 may receive first operational data 310 from a first locomotive, second operational data 320 from a second locomotive, and third operational data 330 from a third locomotive, and store each respective operational data feed on a connected memory storage (not shown). At the same time, controllers 350 and 360 may simultaneously receive the data from each of the other two controllers, respectively, and store the operational data received from the other controllers to each of their respective memory storage (not shown). In this way, recording system 300 may redundantly store operational data from all of the locomotives in the consist on each of the respective memory storage devices associated with each controller 340, 350, and 360.

Figure 4:
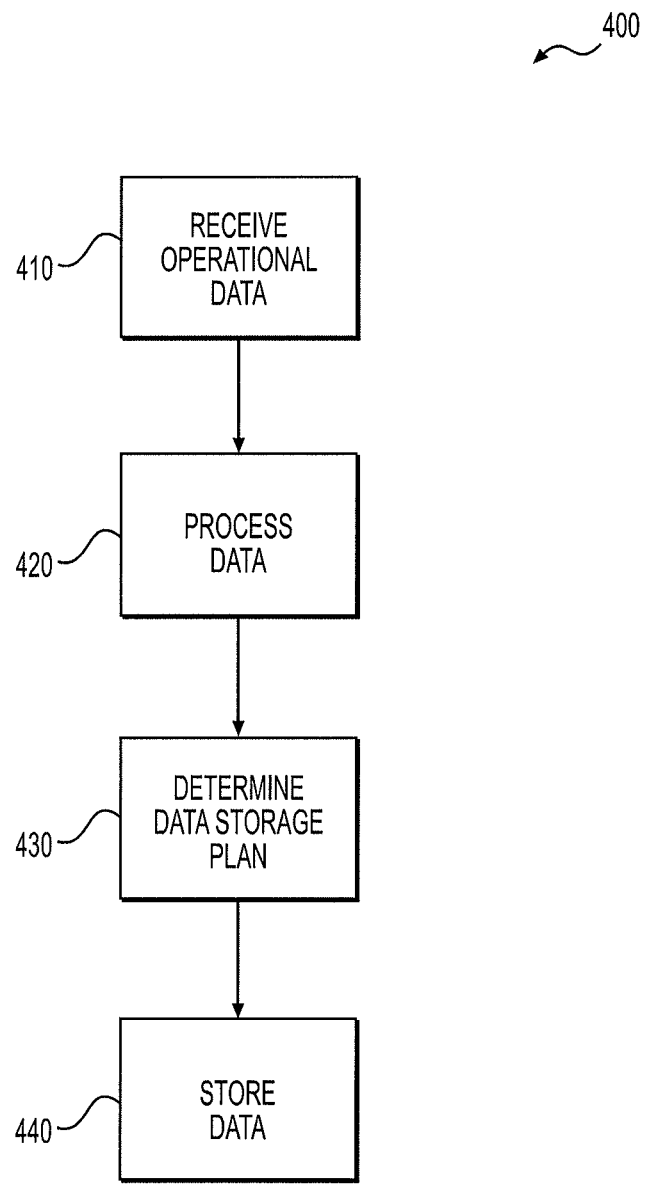
FIG. 4. is a flowchart of an exemplary embodiment of a method for controlling data storage associated with a redundant data storage system.

FIG. 4 is a flowchart of an exemplary embodiment of a computer-implemented method for data redundancy storage. In this manner, the system of method 400 may redundantly store operational data across two or more of a plurality of controllers. While embodiments described herein refer to recording system 200, controller 240, camera 210, operational data 215, etc., it should be understood that the described embodiments of method 400 may be equally applied to recording system 300. Furthermore, one or more controllers in a consist may be configured as a "lead" controller, and determine a data storage plan for the entire consist, while the other controllers are configured to receive and follow directions issued by the lead controller.

According to one embodiment, at step 410, controller 240 may receive operational data 215. Controller 240 may process the data (step 420) by analyzing the data, and determining a data storage plan (step 430) based on the analysis of the operational data. For example, controller 240 may process operational data 215 by analyzing the operational data that includes one or more images of the surrounding environment.

For example, at step 420, controller 240 may process the data, and conduct a qualitative analysis of the data. According to one aspect, controller 240 may receive an image of the surrounding environment received from camera 210 and analyze the image. Based on analysis of the image, controller 240 may determine whether the image is indicative of a probable event area, which is an area in which events are deemed more likely to occur based on environmental factors. If controller 240 determines that the image indicates a probable event area, controller 240 may change the data storage plan in one of two general ways. First, the number of redundant controllers on which the operational data is redundantly stored may be adjusted. For example, while one controller may be used for storage during an "uneventful" operation of the locomotive, controller 240 may add additional controllers (storage locations) at which redundant data is stored when an adverse event is deemed to be imminent. Second, the manner in which the operational data is stored may be changed. For example, controller 240 may increase the quality or frequency of the camera activity, and direct low resolution data to one storage location, and high resolution redundant data storage to another location.

Controller 240 may determine a data storage plan based on the detection of a high likelihood for the occurrence of an adverse event (e.g., a probable event). For example, a probable event may be an adverse event that controller 240 has determined is imminent, such as a collision with another vehicle or pedestrian. A probable event area may be a physical location and/or a geographic location where an accidental event may be more likely to occur. For example, a collision with a car may be more likely to occur in populated areas than in remote areas. Thus, populated areas may be one example of a probable event area. Furthermore, signs posted near the railroad may be indicative of a change in condition that a locomotive controller may flag as a potential probable event area. For example, signs may be indicative of falling rocks or of upcoming curves. Thus, areas near railway signs may be another example of a probable event area. Traffic information may also be used by controller 240 to determine whether an area is a probable event area. For example, traffic information may be determined by controller 240 based on video data received from camera 210. In another aspect, traffic information may be determined based on traffic data received via satellite (not shown), cellular data (not shown), or via other means.

If controller 240 determines at step 420 that operational data 215 is indicative of a probable event area, then at step 430, controller 240 may command camera 210 to record image data at a first resolution, where the first resolution images occupy more space than images recorded at the lower, second resolution. Alternatively, if controller 240 determines that the image is not indicative of a probable event area, at step 430 controller 240 may command camera 210 to record images at the second resolution.

According to one exemplary embodiment, operational data 215 may include information from the power system 150, for example, information indicative of temperature, power level, fuel efficiency, fuel level, braking information, etc. The operational data may be used by controller 240 to determine a data storage plan based on the power system information. For example, during normal operation in a low-probability event environment (such as, for example, operating the locomotive at a low velocity in an open field with no perceived hazards), controller 240 may record operational data 215 at controller 240 with high resolution, and redundantly store the recorded data across one or more additional event recorders in lower resolution. An example of a high resolution storage of control data may include, e.g., data indicating one or more alarm and/or alert signals at a shorter interval (e.g., 500 ms) as compared to a lower resolution storage (e.g., intervals of 1.5 secs). If an event triggers an alarm and/or alert signal as part of the power system of the locomotive (such as, for example, a vehicle intersecting the path of the locomotive is detected), controller 240 may determine a data storage plan that includes automatically increasing the recording resolution of one or more of a plurality of cameras operatively connected to controller 240, and changing the redundancy settings to switch from a low resolution recording on the redundant controllers (e.g., 250 and 260) to a high resolution recording. Controller 240 may process the video data to a different resolution based, at least in part, on the operational data. Accordingly, controller 240 may store the operational data at different resolutions at the first controller and the second controller, which may avoid data loss while at the same time maximize storage space.

The data storage plan may be determined based on an alert status. For example, an alert status may include information indicating that an alert or alarm is continuously active for a period of time (for example, five seconds). According to another aspect, an alert status may indicate that two or more alarms have been activated based on information from power system 150. According to another embodiment, an alert status may indicate that a predetermined number of alarms have been activated (for example, three alarms), and/or a particular number of alarms have been activated in a particular order. For example, an alert status may indicate that emergency brakes have been deployed, a warning horn has been deployed, and a vehicle has been detected in the path of the locomotive, all within a short period of time. The data storage plan may further include saving operational data to one or more additional controllers as redundant storage devices as a measure to reduce the risk of the loss of operational data in the event of a catastrophic loss.

The data storage plan may change dynamically in response to changing environmental and/or operational factors. For example, according to some embodiments, controller 240 may be configured to switch between data collection at a first resolution and data collection at a second resolution, based on alarms, alerts, speed, environmental hazards, anticipated or real physical hazards, etc. For example, controller 240 may be configured to detect audio signals and determine whether those signals are indicative of a probable event. For signals and/or sounds that are indicative of a probable event, controller 240 may be configured to switch to collecting data at a first resolution in response to these sounds. For example, these sounds may include a horn (such as a car horn or a locomotive horn), a crossing bell, and/or a locomotive bell. Other types of audio signals may be used by controller 240 to control the resolution at which the images are being captured. Other operational factors may include image data. Accordingly, controller 240 may determine based on image data that includes image data of the physical surroundings that another locomotive is within a dangerous proximity to the locomotive of system 400.

According to some embodiments, controller 240 may determine a data storage plan that includes routing the data storage based on the proximity of a first controller to one or more controllers to which the operational data is to be redundantly stored. For example, the data storage plan may provide the operational data to a second controller when a probable event is detected. The second controller may be physically located in another locomotive. In this respect, if a probable event is detected, the data storage plan may provide the data to the second controller for redundant storage in preparation for a probable event, which may avoid any data loss if a catastrophic event destroys the first controller. As another example, a data storage plan may include storing data to a one or more controllers, where controller 240 selects one or more alternate controllers for receiving and storing the operational data based on their proximity to one another and to the point of hazard (e.g., a point of predicted danger). For example, in the case of a detected hazard that endangers the lead locomotive, controller 240 may increase redundant storage to include a storage medium physically located at a further proximity with respect to the point of hazard.

At step 440, controller 240 may store the operational data 215 for redundant storage according to the data storage plan determined at step 440.

INDUSTRIAL APPLICABILITY

The disclosed systems and methods may provide a robust mechanism for redundant data storage. The presently disclosed systems and methods may have several possible advantages. For example, this system may dynamically change the quality of recorded data in response to identifying particular environmental factors, and determine a data storage plan that reduces the possibility of data loss in a catastrophic event. Since environmental factors such as speed, hazards, traffic, etc. change during the operation of a locomotive, the disclosed systems may dynamically change the redundant storage plan in response to the changing environmental factors. By changing the quality of the recorded data and the storage locations of the data, data loss may be minimized or eliminated in the event of an accident. This system may also provide the advantage of decreasing the probability of data loss, while minimizing the necessary data storage space.

Additionally, there may be an increased value of the recorded data, based on the dynamically varied resolution at which data is recorded. For example, if camera data provides the highest value information in a given event, having the camera resolution at a higher resolution during the moments prior to a crash may be invaluable to an investigative team determining causation.

It will be apparent to those skilled in the art that various modifications and variations may be made to the disclosed systems and methods for data storage. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. An event recorder system, comprising:
a first controller configured to:
receive and record operational data associated with operation of a locomotive, the operational data including video data in connection with physical surroundings of the locomotive;
process, via a processor, the operational data;
identify one or more potential hazards in response, at least in part, to the video data;
determine, using the processor, a data storage plan for the operational data, wherein the data storage plan can dynamically change based on the operational data, the data storage plan based, at least in part, on identifying the one or more potential hazards; and store the operational data with a second controller associated with a second locomotive according to the data storage plan.

2. The event recorder system of claim 1 wherein the data storage plan includes providing the operational data to the second controller when a probable event is detected.

3. The event recorder system of claim 2, wherein the data storage plan for the second controller is based on its proximity to the first controller.

4. The event recorder system of claim 2, wherein one or more controllers may be selected based on their proximity with respect to a point of hazard.

5. The event recorder system of claim 1, wherein the data storage plan is further is based on one or more of an alarm status, and an alert status.

6. The event recorder system of claim 1, wherein the data storage plan further includes processing the video data to a different resolution based, at least in part, on the operational data.

7. The event recorder system of claim 1, wherein the data storage plan includes storing the operational data at different resolutions at the first controller and the second controller.

8. The event recorder system of claim 1, wherein the first controller and the second controller are operably connected through a communication network.

9. The event recorder system of claim 1 wherein the first controller and the second controller are in direct communication with each other.

10. A computer-implemented method for operating an event recorder system via a first controller comprising:
receiving and recording operational data associated with operation of a locomotive, the operational data including at least one of an alarm status and an alert status;
processing, via a processor, the operational data;
determining, using the processor, a data storage plan for the operational data, wherein the data storage plan can dynamically change based on the operational data, and the data storage plan is based, at least in part, on the at least one of the alarm status and the alert status; and
storing the operational data with a second controller associated with a second locomotive according to the data storage plan.

11. The computer-implemented method of claim 10 wherein the data storage plan includes providing the operational data to the second controller when a probable event is detected.

12. The computer-implemented method of claim 11, wherein the data storage plan for the second controller is based on its proximity to the first controller.

13. The computer-implemented method of claim 11, wherein one or more controllers may be selected based on their proximity with respect to a point of hazard.

14. The computer-implemented method of claim 10, wherein determining the data storage plan further includes:
receiving video data in connection with physical surroundings of the locomotive,
identifying one or more potential hazards; and
determining the data storage plan based, at least in part, on the one or more potential hazards.

15. The computer-implemented method of claim 14, wherein the data storage plan is further is based on one or more of a velocity of the locomotive, a time information, a geographic information, and traffic information.

16. The computer-implemented method of claim 14, wherein the data storage plan further includes processing the video data to a different resolution based, at least in part, on the operational data.

17. The computer-implemented method of claim 10, wherein the data storage plan includes storing the operational data at different resolutions at the first controller and the second controller.

18. The computer-implemented method of claim 10, wherein the first controller and the second controller are operably connected through a communication network.

19. A non-transitory computer-readable storage medium storing program code operable to cause a processor of a first controller located on a first locomotive to, when executed:
receive and record operational data associated with operation of the first locomotive;
process, via the processor, the operational data;
identify a point of hazard based on the operational data;
determine the proximity of each of multiple controllers to the point of hazard, each of the multiple controllers located on a locomotive different than the first locomotive;
determine, using the processor, a data storage plan for the operational data, wherein the data storage plan can dynamically change based on the operational data, and wherein the data storage plan is based, at least in part, on the proximity of each of the multiple controllers to the point of hazard; and
store the operational data with a second controller associated with a second locomotive according to the data storage plan, the second controller selected from the multiple controllers based, at least in part, on the proximity of the second controller to the point of hazard.

20. The event recorder system of claim 1, wherein the data storage plan is further is based on one or more of a velocity of the locomotive, a time information, a geographic information, and traffic information.

* * * * *